United States Patent
Racha et al.

(10) Patent No.: US 8,560,739 B2
(45) Date of Patent: Oct. 15, 2013

(54) METHODS AND SYSTEMS FOR REGULATING OPERATION OF ONE OR MORE FUNCTIONS OF A MOBILE APPLICATION

(75) Inventors: Srini Racha, Northville, MI (US); David Marvin Gersabeck, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 12/980,007

(22) Filed: Dec. 28, 2010

(65) Prior Publication Data

US 2012/0166788 A1 Jun. 28, 2012

(51) Int. Cl.
*G06F 3/00* (2006.01)
(52) U.S. Cl.
USPC .................................. 710/8; 710/14
(58) Field of Classification Search
None
See application file for complete search history.

(56) References Cited

U.S. PATENT DOCUMENTS

| | | | |
|---|---|---|---|
| 6,690,956 B2 | 2/2004 | Chua et al. | |
| 7,207,041 B2 | 4/2007 | Elson et al. | |
| 7,266,435 B2 | 9/2007 | Wang et al. | |
| 7,471,929 B2 | 12/2008 | Fujioka et al. | |
| 7,505,784 B2 | 3/2009 | Barbera | |
| 7,602,782 B2 | 10/2009 | Doviak et al. | |
| 7,801,941 B2 | 9/2010 | Conneely et al. | |
| 7,957,773 B2 | 6/2011 | Chua et al. | |
| 8,131,205 B2 * | 3/2012 | Rosen | 455/1 |
| 2002/0098853 A1 | 7/2002 | Chrumka | |
| 2003/0079123 A1 | 4/2003 | Mas Ribes | |
| 2004/0203660 A1 | 10/2004 | Tibrewal et al. | |
| 2004/0260438 A1 | 12/2004 | Chernetsky et al. | |
| 2004/0267585 A1 | 12/2004 | Anderson et al. | |
| 2005/0091408 A1 | 4/2005 | Parupudi et al. | |
| 2005/0177635 A1 | 8/2005 | Schmidt et al. | |
| 2006/0150197 A1 | 7/2006 | Werner | |
| 2006/0156315 A1 | 7/2006 | Wood et al. | |
| 2006/0190097 A1 | 8/2006 | Rubenstein | |
| 2006/0287787 A1 | 12/2006 | Engstrom et al. | |
| 2007/0016362 A1 | 1/2007 | Nelson | |
| 2007/0042809 A1 | 2/2007 | Angelhag | |
| 2007/0042812 A1 | 2/2007 | Basir | |
| 2007/0050854 A1 | 3/2007 | Cooperstein et al. | |
| 2007/0124043 A1 | 5/2007 | Ayoub et al. | |
| 2007/0132572 A1 | 6/2007 | Itoh et al. | |
| 2007/0294625 A1 | 12/2007 | Rasin et al. | |
| 2008/0148374 A1 | 6/2008 | Spaur et al. | |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Idriss N Alrobaye
*Assistant Examiner* — David Martinez
(74) *Attorney, Agent, or Firm* — Jennifer M. Stec; Brooks Kushman P.C.

(57) ABSTRACT

Various embodiments include a method for regulating operation of mobile applications executing on a nomadic device. Signals for determining a speed of travel may be received at the nomadic device. The speed may be determined based on the one or more signals. If the determined speed exceeds a speed threshold, a speed restriction flag may be set and one or more functions of the mobile applications may be restricted. If, after setting the speed restriction flag, a speed cannot be determined, the application functions may be continually restricted until a speed can be determined.

6 Claims, 5 Drawing Sheets

(56) References Cited

U.S. PATENT DOCUMENTS

| | | |
|---|---|---|
| 2008/0220718 A1 | 9/2008 | Sakamoto et al. |
| 2008/0313050 A1 | 12/2008 | Basir |
| 2009/0075624 A1 | 3/2009 | Cox et al. |
| 2009/0106036 A1 | 4/2009 | Tamura et al. |
| 2009/0117890 A1 | 5/2009 | Jacobsen et al. |
| 2009/0228908 A1 | 9/2009 | Margis et al. |
| 2009/0253466 A1 | 10/2009 | Saito et al. |
| 2009/0318119 A1 | 12/2009 | Basir et al. |
| 2010/0035632 A1 | 2/2010 | Catten |
| 2010/0063670 A1 | 3/2010 | Brzezinski et al. |
| 2010/0094996 A1 | 4/2010 | Samaha |
| 2010/0098853 A1 | 4/2010 | Hoffmann et al. |
| 2010/0216509 A1* | 8/2010 | Riemer et al. ............... 455/557 |
| 2010/0306309 A1 | 12/2010 | Santori et al. |
| 2011/0039581 A1* | 2/2011 | Cai et al. .................... 455/456.4 |
| 2011/0077032 A1* | 3/2011 | Correale et al. ............. 455/466 |
| 2011/0105082 A1* | 5/2011 | Haley ......................... 455/411 |
| 2011/0105097 A1 | 5/2011 | Tadayon et al. |
| 2011/0112762 A1 | 5/2011 | Gruijters et al. |
| 2011/0195659 A1 | 8/2011 | Boll et al. |
| 2011/0257973 A1 | 10/2011 | Chutorash et al. |
| 2011/0296037 A1 | 12/2011 | Westra et al. |
| 2012/0054300 A1 | 3/2012 | Marchwicki et al. |
| 2012/0079002 A1 | 3/2012 | Boll et al. |

OTHER PUBLICATIONS

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

* cited by examiner

METHODS AND SYSTEMS FOR REGULATING OPERATION OF ONE OR MORE FUNCTIONS OF A MOBILE APPLICATION

BACKGROUND

1. Technical Field

Various embodiments relate to regulating operation of one or more functions during use of a mobile application. In some embodiments, the functions of the mobile application may be restricted when a nomadic device on which the mobile application is executing is determined to be moving. In some embodiments, the nomadic device may be in a vehicle.

2. Background Art

Various examples of tools that block mobile phone functionality prevent mobile phone use during vehicle movement. These tools typically disable the touchscreen or the keypad of the mobile phone.

As one example, U.S. Publication No. 2010/0216509 to Riemer et al. discloses a portable device which includes a safety feature that prevents some forms of use when the device is moving. The device may detect its speed or movement, compare that to a threshold, and provide a response or blocking function upon exceeding that threshold. The device may be a cell phone configured to disable transmission and reception of voice/text, conceal its display screen, and disable incorporated features and functions, if the cell phone is moving faster than walking speed or the movement is uncharacteristic of walking. The blocking function may be partially overridden based on a safety policy, which can be managed and customized. The introduction of hands-free devices may serve to override a blocking function and enable other functions.

Other examples include cell phone blocking products offered by TURN OFF THE CELL PHONE, LLC. This product automatically turns off the cell phone when the user is driving. It eliminates all phone activity while driving such as phone calls, text messaging, emails, web surfing and others. Notifications are sent to safety managers or parents confirming that the phone is not being used while driving.

SUMMARY

One aspect includes a computer-implemented method for regulating operation of one or more mobile applications. The method may include receiving one or more signals on a nomadic device for determining a speed at which the nomadic device is travelling. The speed at which the nomadic device is travelling may be determined based on the one or more signals.

If the determined speed exceeds a speed threshold, a speed restriction flag may be set and one or more functions of the mobile applications may be restricted. The mobile applications may be executing on the nomadic device.

Further, if, after setting the speed restriction flag, a speed cannot be determined, the functions of the one or more applications may be continually restricted until a speed can be determined.

In some embodiments, if the speed cannot be determined and the speed restriction flag is not set, the one or more functions mobile applications may be enabled until a determination is made that the determined speed exceeds the speed threshold.

In another aspect, which may include a computer-implemented method for regulating operation of one or more mobile applications, the nomadic device may monitor for one or more signals for determining a speed of travel of the nomadic device. If a speed cannot be determined, it may be determined if inputs to a mobile application, which may be executing on the nomadic device, are restricted or unrestricted.

If the inputs restricted, the one or more inputs to the application may continually be restricted until a speed can be determined. If the inputs are unrestricted, the inputs to the application may be permitted until a determination is made that a determined speed of the nomadic device exceeds one or more speed thresholds.

In another aspect, system includes a nomadic device and a mobile application. The mobile application may be executing on the nomadic device. Further, the mobile application may have instructions for receiving signals for determining a speed of travel and determining the speed.

If the speed exceeds a speed threshold, further instructions may include setting a speed restriction flag and restricting functions of the mobile application.

If, after setting the speed restriction flag, a speed cannot be determined, the instructions may further include continuing the restricting until a speed can be determined.

In some embodiments, the nomadic device may be in a vehicle. As such, the instructions of the mobile application may be executed if one vehicle occupant is in the vehicle.

In some embodiments, further instructions may include receiving instructions to override restricting inputs to the mobile application. The override may be based on a presence of more than one vehicle occupant.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

The use of mobile applications (e.g., applications on a mobile phone) is increasingly becoming more pervasive.

Mobile applications are available for almost any use such as games, social networking, news, word processing, and navigation.

One common example of a mobile application, particularly used by owners of a vehicle without a factory installed navigation system, is a navigation mobile application. These navigation mobile applications may be as robust as factory installed navigation systems, but at a much lower cost. Many times, these applications are even less expensive than retail portable navigation systems. Accordingly, many owners of a mobile phone (typically, a smartphone) may have at least one navigation application downloaded to the device.

However, most, if not all, mobile applications are unnecessary for communication. Further, these mobile applications can be distracting while in a vehicle. While many vehicles today have computing systems that may block mobile phone use or, if the vehicle is not outfitted with a computing system, software may be downloaded to a mobile phone to block its use, entirely blocking cell phone usage may become inconvenient as the phone may still be necessary for communication. It may be helpful to block the use of such mobile applications rather than use of the mobile phone entirely.

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Additionally, the disclosure and arrangement of the figures is non-limiting. Accordingly, the disclosure and arrangement of the figures may be modified or re-arranged to best fit a particular implementation of the various embodiments of the invention.

Figure 1:
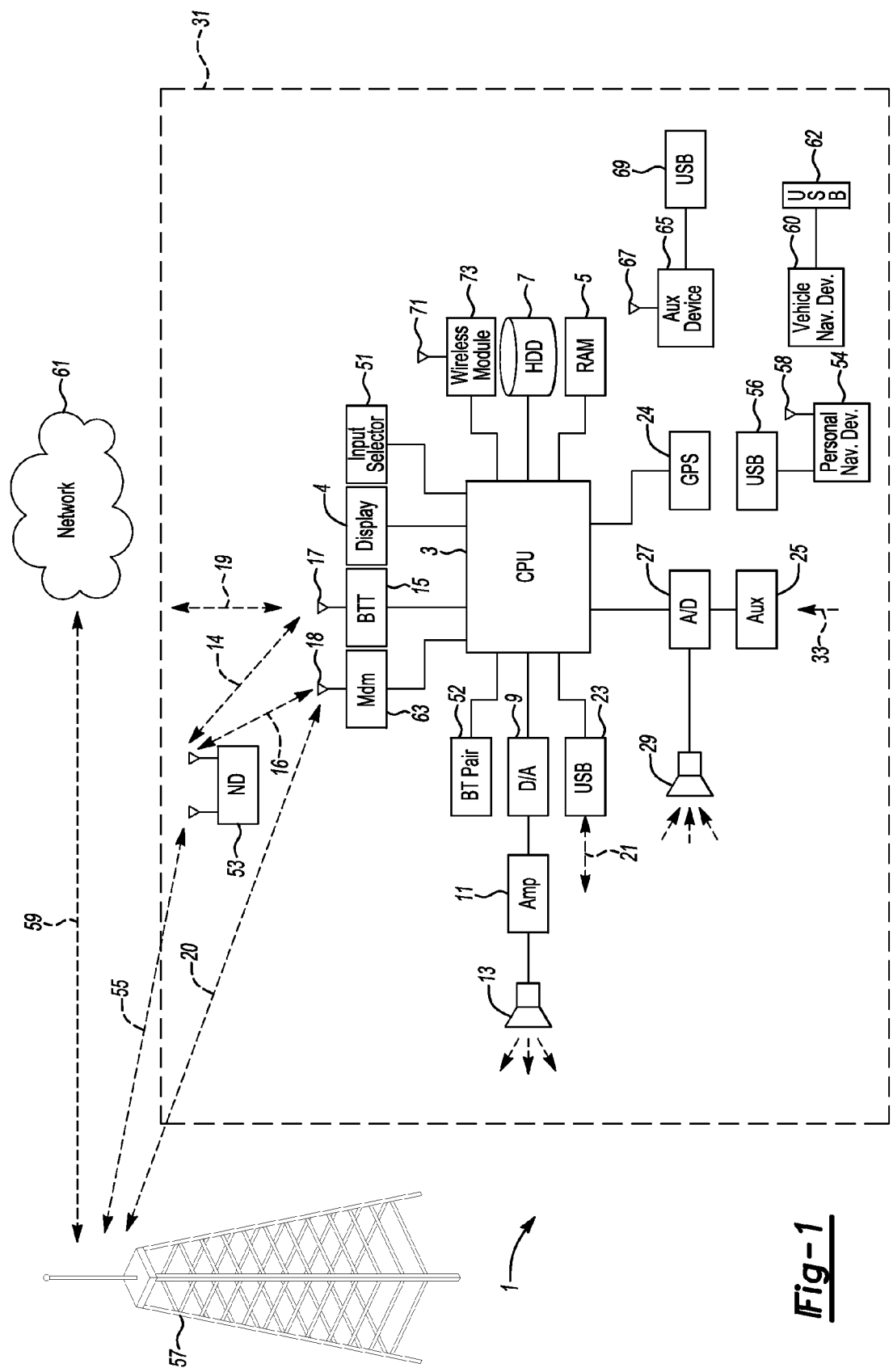
FIG. 1 is an illustrative block topology of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

Figure 2:
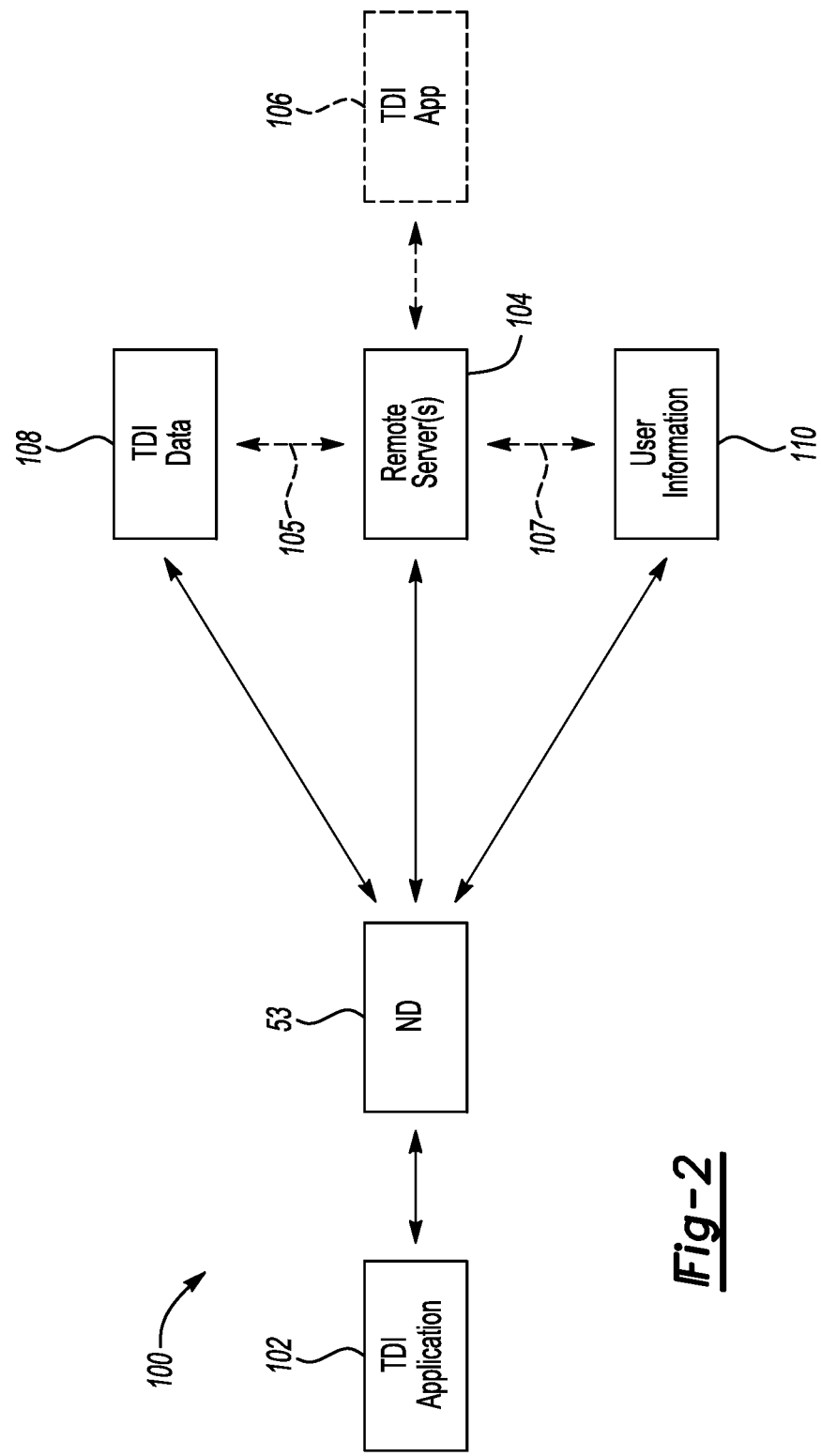
FIG. 2 illustrates a non-limiting example of a system comprising a traffic, directions, and information (TDI) application on a nomadic device.

FIG. 2 illustrates a block topology of a mobile application system 100. The mobile application 102 may be any mobile application that offers various services including, but not limited to, games, social networking, search engines, navigation, and others. As used herein for simplicity and illustration, the various embodiments of the mobile application 102 will be described in the context of a TDI mobile application. The TDI application 102 may be a navigation application that provides traffic, directions and information from the ND 53. Accordingly, as shown in FIG. 2, the mobile application system is associated with a traffic, direction, and information (TDI) mobile application.

The mobile application 102 may be installed on a nomadic device 53 which, as described above with respect to FIG. 1, may communicate with the VCS 1 (not shown in FIG. 2). For example, in scenarios where the VCS 1 does not include a navigation system, ND 53 (having the mobile application 102) may be used for navigation while the VCS 1 may be used for, for example, hands-free communication.

Of course, the ND 53 does not necessarily need to communicate with the VCS 1 for purposes of operating the mobile application 102. For example, the mobile application 102 (and the various embodiments of the mobile application as described herein) may be operable on the ND 53, as a standalone device, in or out of the vehicle.

The mobile application 102 may be capable of receiving touch-based inputs (e.g., from a keypad and/or a touchscreen) and/or voice inputs. Further, information may be output by the application 102 visually and/or audibly.

In some embodiments, the TDI application 106 (as represented by the dashed lines) may be executing on the remote server 104 and operated from the ND 53 via an Internet connection (e.g., via network 61). In this case, the application 102 may be an application programming interface (API) for operating the mobile application 106. Further details of this remote operation of the mobile application 106 will be described below. Unless otherwise indicated, for purposes of simplicity, the details of the various embodiments will be described in the context of the mobile application 102 executing on the ND 53.

The TDI application 102 may provide various navigation related operations when executing on the ND 53 or the remote server(s) 104. As non-limiting examples, the operations may include, but are not limited to, navigation information and maps, traffic maps with speed, flow, and incident data, time(s) to leave and estimated time of arrival, predictive traffic (traffic forecast), crowd sourced traffic data, location search, storing locations, and traffic maps and alternatives.

The mobile application 102 may be downloaded to the nomadic device 53 and/or may be accessible via a web-based application. Details of the application download process will be described with respect to FIG. 3.

Operating remotely from the ND 53, one or more systems 108 storing TDI data may be used by the TDI application 102. The system(s) 108 may store mapping information, traffic information, and destination information (including, but not limited to, POIs and reverse geocoded destination information)). In some embodiments, the TDI system 108 may store destination and/or location information for the user. Of course, system 108 may comprise multiple systems and is illustrated as a single system for illustration.

Additionally operating remotely from the ND 53 may be a user information system 110. The user information system 110 may store information about the mobile application user (including, but not limited to, user identification information (e.g., name, address, and the like), login information, vehicle identification information, and mobile identification). In some embodiments, subscription information for the service may be stored in the system 110. In some embodiments, the destination and location information may be stored in user information system 110 or, if stored in the TDI system(s) 108, associated with a user via the user information system 110. In some embodiments, the locations and destinations may be synchronized and stored with previously saved destinations and locations.

In one embodiment, as described above, the mobile application 106 may be installed on the remote server(s) 104 from which the application may be executing. When executing from the server(s), the mobile application 106 (via remote server 104) may communicate 105 with the TDI information system 108 and communicate 107 with the user information system 110. When operating the mobile application 106 from the ND 53, an API 102 may be installed on the ND 53. The API 102 may be downloaded from an application store (which may or may not be remote system 104). The information exchange and operation of the mobile application 106 may occur over the Internet.

In an alternative embodiment, when the mobile application is executing on the ND 53, the remote server system(s) 104 may be a system from which the mobile application 102 is downloaded (e.g., via an Internet connection). The mobile application 102 may be downloaded and installed directly from the ND 53 or downloaded to memory (e.g., a USB drive or PC) and transferred for installation to the ND 53. In some embodiments, the remote system(s) 104 may be a mobile application store hosted by, for example, the OEM or a third-party.

Figure 3:
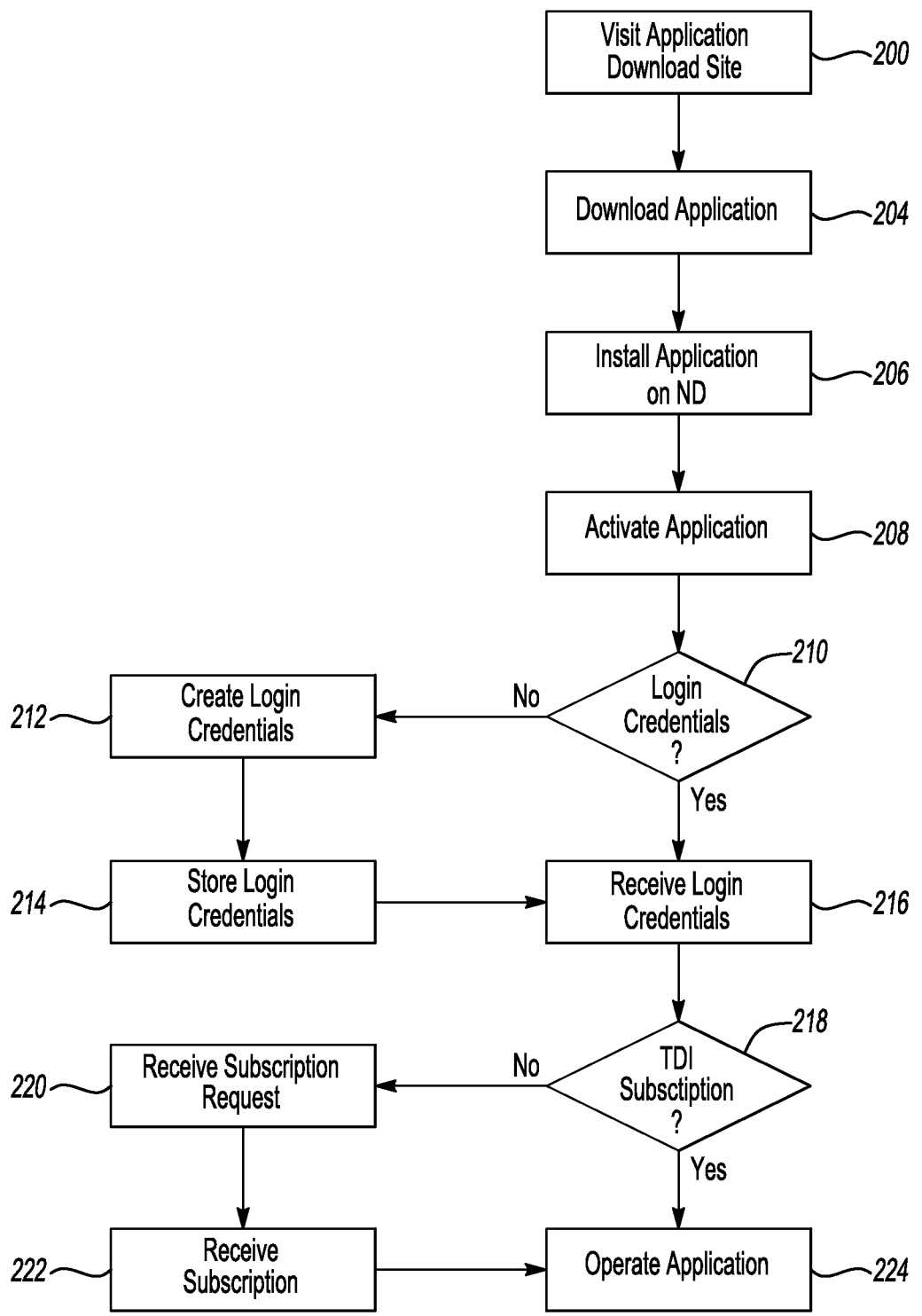
FIG. 3 illustrates a process for installing and activating the TDI application.

FIG. 3 illustrates the process associated with installing the application 102 to the ND 53 and the process for activating the application 102 for operation. The application 102 may be downloaded to the ND 53 from an application store (block 200). The application 102 may be downloaded (block 204) and installed on the ND 53 (block 206).

Once installed on the ND 53, the application 102 may be started and loaded on the ND 53 (block 208). The application 102 may be started and loaded by selecting one or more graphical commands (e.g., an icon representing the application 102), selecting the application 102 from a menu, and/or using audible commands.

When the application 106 is executing remotely, use of the application 102 may be enabled from a website. Accordingly, the application 106 may be loaded when the website is visited.

The user's login credentials may be requested (block 210). An example of a login credential may include a username and password. The user may or may not have login credentials. If the user does not have login credentials, the credentials may be created (block 212). The login credentials may be created by the user and/or provided by an OEM. The login credentials may be created and/or obtained from the OEM electronically (e.g., from a website). Once created, the credentials may be stored (e.g., at user information system 110) (block 214).

When the user has login credentials, the credentials may be received through user entry when requested (block 210). Accordingly, the credentials may be received at the ND 53 (block 216).

In some embodiments, to use the mobile application 102, the user may need a subscription to the service from the OEM. The subscription may have a time limit. As a non-limiting example, the subscription may be an annual subscription. Accordingly, the subscription status may be verified (block 218). If the user does not have a subscription (e.g., it was never created or it has expired), a subscription request may be received from the user (e.g., at the ND 53) (block 220). The subscription may be received and stored in the user information system 110 (block 222). The subscription may be established electronically or by contacting the OEM or a dealership to obtain a subscription.

When the user has a subscription, the application 102 may be operated from the ND 53 (block 224). As will be described in detail below, as part of operating the application 102, one or more features of the application 102 may be blocked in order to restrict use of the application while the vehicle 31 is in operation. The locking feature of the application 102 may be activated based on a driving status of the vehicle 31. Various embodiments of the locking process will be described below with the remaining figures.

Figure 4:
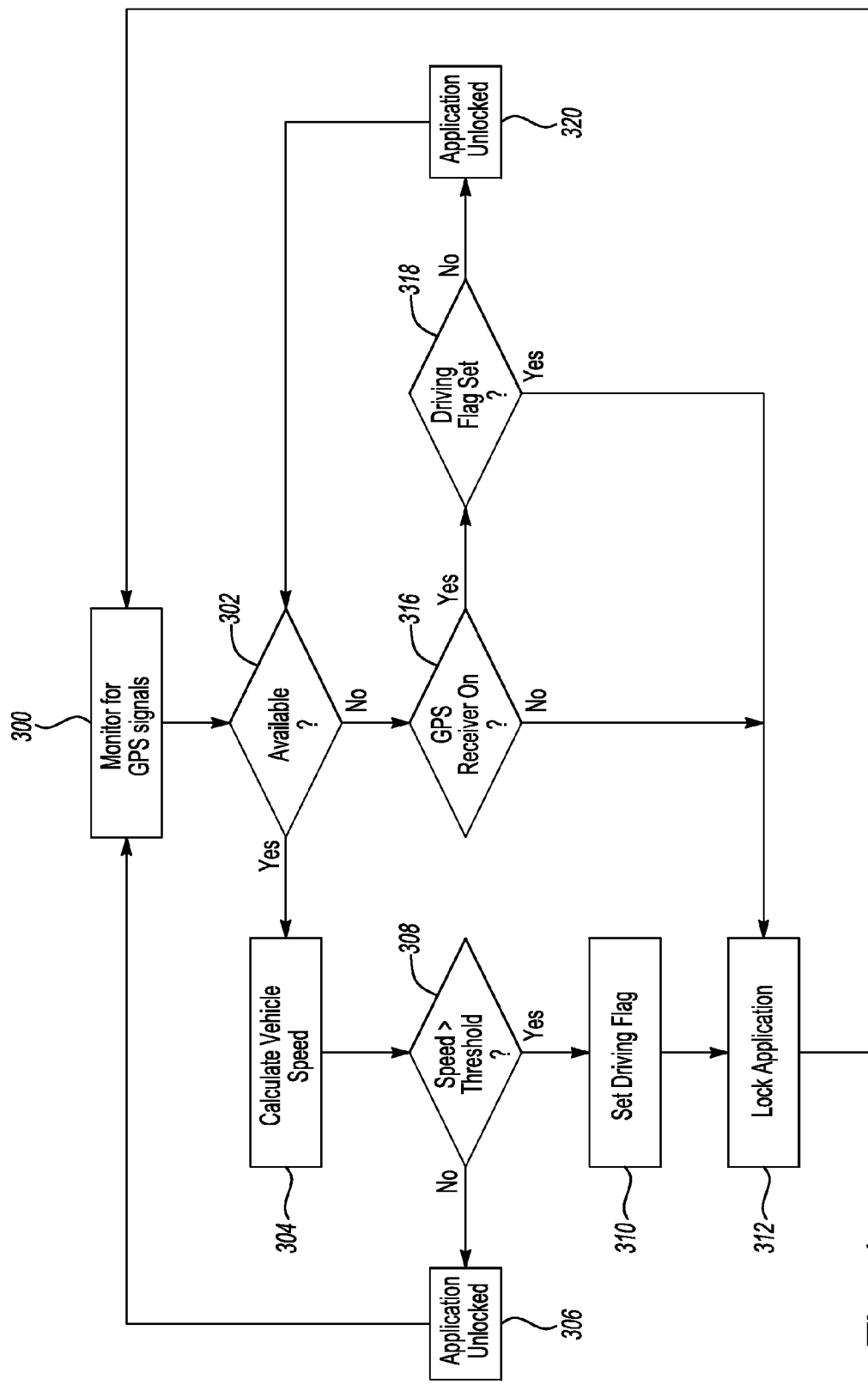
FIG. 4 illustrates a process for locking and unlocking the TDI application during application use.

FIG. 4 illustrates a process for regulating the use of the mobile application 102 while traveling. The process of FIG. 4 is contemplated as being used when in a vehicle, although this is not necessary.

The ND 53 may be configured with a device that may be used in calculating vehicle speed. Such devices may include, but are not limited to, a GPS receiver, an accelerometer, or a gyro. For purposes of illustration, FIGS. 4 and 5 are described in the context of using a GPS receiver.

The ND 53 may monitor for one or more speed detection signals (e.g., GPS signals) (block 300) in order to detect movement of the vehicle and, therefore, its speed. In the case where a GPS receiver is used, for example, the signals may be detected from a satellite transmitting GPS signals. Accordingly, in order to block use of the application 102, the speed of the vehicle may be detected from the signal(s), if available (block 302). If the signal(s) are available, the vehicle speed may be calculated based on information obtained from the GPS signals (block 304).

Figure 5:
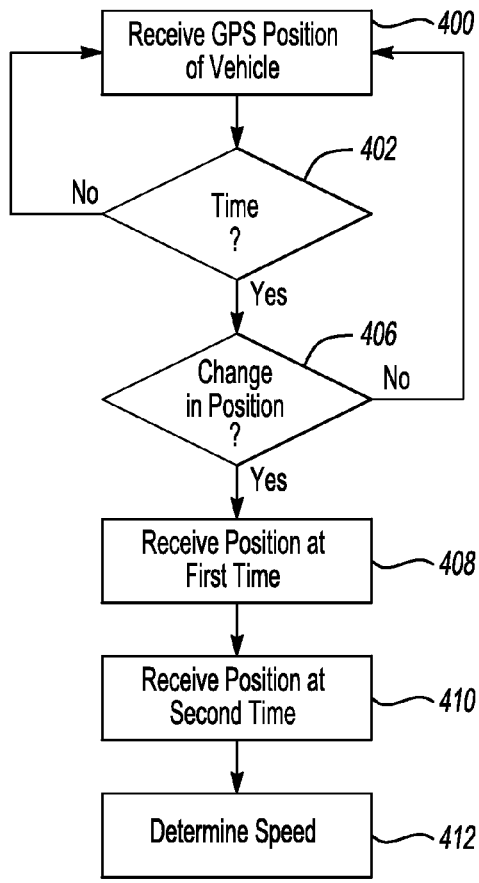
FIG. 5 illustrates a process for calculating vehicle speed in order to determine whether to lock or unlock the TDI application.

FIG. 5 illustrates the calculation process for the speed of the vehicle based on GPS information. The speed of the vehicle may be determined by the application 102. GPS information may include, but is not limited to, longitude and latitude information of the vehicle. As represented by block 400, the GPS position of the ND 53 may be received by the application 102.

As part of determining the speed, the application 102 may use the ND's clock or a GPS clock to measure a passage of one or more periods of time. The speed may, thus, be determined based on a change in position within one or more periods of time. This determination may be made periodically. For example, a period may be based on seconds or minutes or variations of seconds or minutes. By way of example and not limitation, the position of the ND 53 may be measured every "X" seconds. Additionally or alternatively, the position may be measured during one or more intervals of time. For example, and without limitation, the position may be measured during one or more "X" second intervals.

At a certain time, the GPS position of the ND 53 may be determined (block 402). When the time period for determining the position of the ND has been reached, a determination may be made if the ND 53 has changed position (block 406) based on the GPS information from the ND 53. If a change has not been detected, the application 102 may receive the GPS position from the ND 53 and continue to measure the passage of time. Once a change in position is detected, a position at a first time may be received and recorded (block 408). Further, a position at a second time may be received and recorded (block 410). The change in position (e.g., based on change in latitude and longitude) at or within the time periods may be determined. Based on this determination, the speed of the vehicle may be determined (block 412).

In some embodiments, the speed may be determined based on a distance traveled and one or more periods of time. Accordingly, based on the GPS information from the ND 53, a distance traveled over a period of time may be determined. Based on this determination, the speed may be detected. Of course, other methods of detecting speed may be used without departing from the scope of the invention.

Referring back to FIG. 4, based on the calculated speed, it may be determined if the speed is above a speed threshold (block 306). The speed threshold may define when to restrict one or more functions for using the mobile application 102. Restricting functions may include locking one or more input controls of the ND and/or restricting input recognition by the application 102. As a non-limiting example, if the ND 53 includes a touchscreen display or a keypad, the display or keypad may be blocked from use. As another non-limiting example, the touchscreen and/or keypad may be unlocked, but inputs may not be recognized or received by the application 102.

In some embodiments, select input controls may be locked. For example, and without limitation, the display and/or keypad may be locked, but voice input may be unlocked. As another example, voice inputs may be recognized but not inputs from the display and/or keypad. As another example, the application 102 may provide output, however input may be restricted.

Further, the ND 53 may be otherwise operable when the speed threshold is exceeded. For example, when the application 102 is executing, phone calls may be received and placed, text messages exchanged, and connectivity to the Internet unlocked. Accordingly, the mobile application 102 may include logic for restricting functionality with respect to input and/or output functions on the ND 53 or the VCS 1 for using the application 102. However, other functions of the ND 53 or the VCS 1 may be available when the mobile application 102 is executing.

If the calculated speed is less than the speed threshold (block 306), application 102 operation may be unrestricted (block 308) (also referred to herein as the application being "unlocked"). The application 102 (via the ND 53) may continue monitoring for GPS signals in order to determine vehicle speed.

In some embodiments, there may be multiple speed thresholds. Further, each speed threshold may cause different and additional functions of the mobile application 102 to be restricted. As an example, select functions may be restricted at low speeds while all functions may be restricted at high speeds. Of course, there may be a range of thresholds and a range of functions that may be restricted.

If the speed is greater than the speed threshold (block 306), one or more flags (also referred to herein as a "restriction flag") may be set by the application 102 indicating that the speed is greater than the speed threshold (block 310). A non-limiting example of a speed threshold that may set the restriction flag may be 5 mphs. Of course, any speed may be used without departing from the scope of the invention. Once the flag is set, operation of the application may be restricted (block 312) (hereinafter referred to as the application being "locked").

The application 102 may continue to monitor the speed via the ND 53 so long as speed detection signals (e.g., GPS signals) are available (block 302). Accordingly, the application 102 may be locked when the speed is greater than the threshold speed as described above.

In some instances, the ND 53 may lose the speed detecting signals. For example, the GPS receiver in the ND 53 may lose GPS signals transmitted from the GPS satellite. In cases where the restriction flag is already set (block 318), even if the GPS signal is lost (and, therefore, speed cannot be detected), the application 102 may be locked (block 312). Once the signals are available based on the monitoring, the application 102 may be unlocked for user operation if the speed is determined to be less than the speed threshold.

In some embodiments, when the signals are not available (block 302), a determination may be made if the device for detecting speed (such as a GPS receiver) is on. Operation of the application 102 will not be permitted without an active speed detection device. Accordingly, the application may automatically lock when the GPS receiver is determined to be turned off (block 316). In some embodiments, in cases where the application 102 may be otherwise unlocked (e.g., the speed is less than the threshold), the application 102 may be locked if the GPS receiver is deactivated.

The restriction flag may be reset after the application is shut down and restarted. At application startup, the restriction flag may not be set (block 318). In this case, the application 102 may be unlocked (block 320). The application 102 may be unlocked until speed is detected and the restriction flag is set. However, if the application is unlocked (before the signals are lost), but the restriction flag was previously set, the application 102 may be locked from user operation (block 318).

In some embodiments, regulating application 102 operation may be based on the presence of one or more conditions. Non-limiting, non-exhaustive example of such conditions may include the presence of one or more passengers in the vehicle (as determined, e.g., from the seat weight sensors or voice recognition) and the presence of one or more paired nomadic device.

As an example of a conditional determination, if at least one additional passenger is detected, the application 102 may be unlocked even if the speed is greater than the speed threshold. Alternatively, if it is determined that at least one additional passenger is in the vehicle, a speed determination (as illustrated in block 308) may not be performed at all. In some embodiments, a flag or other identifier may be set by the application 102 indicating that the application 102 is unlocked.

In some embodiments, the presence of one or more additional passengers may be determined by the VCS 1. The information identifying the presence of more than one passenger may be transmitted to the mobile application 102 from the VCS 1. The identifying information may be, for example, binary information, a flag, or the like. Additionally, in some embodiments, the number of passengers may be provided.

In some embodiments, the conditional determination may be made based on the satisfaction of multiple conditions. As one non-limiting example, the application may be unlocked (notwithstanding the speed being greater than the threshold) if there is more than one passenger detected based on information from the seat weight sensor and there is at least on additional paired nomadic device.

Figure 6:
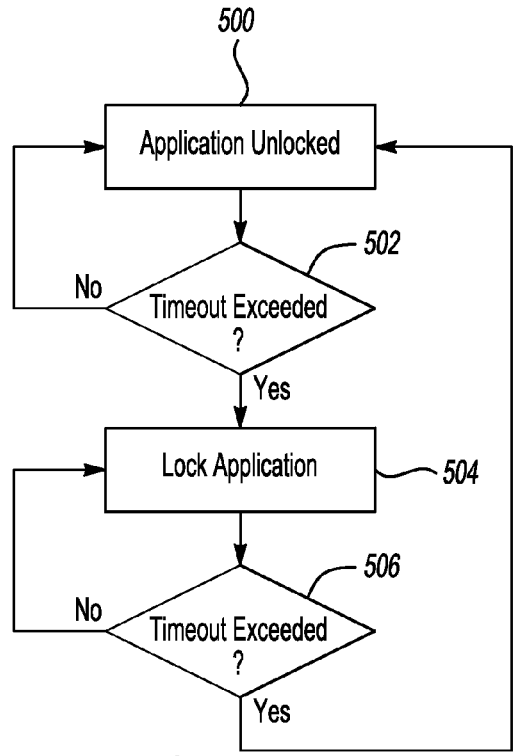
FIG. 6 illustrates a process, according to another embodiment, for locking and unlocking the TDI application during application use.

FIG. 6 illustrates another embodiment of the process for regulating one or more functions of the application 102. When the application is unlocked (block 500), a period of time may be monitored, representing a timeout period, after which the application 102 may be locked (block 502). During the timeout period, the user may freely use the application 102 while the application is unlocked. If the timeout period has elapsed, the application 102 may lock (block 504).

Additionally, a timeout period may be monitored during which the application may be locked (block 506). During this time, the user may be restricted from operating application 102 functions as described above. When the timeout period has elapsed, the application may be unlocked (block 500).

In some embodiments, the unlock timeout period may be determined based on an estimated time to input information to the application 102. The estimated time may be predetermined by the OEM. Further, the timeout period may be measured from when an input defining an instruction for the application 102 is received by the application 102. As a non-limiting example, it may be determined by the OEM that a user takes an average of "X" seconds to input a destination as a POI. Accordingly, when inputting a POI, the timeout period may be measured at "X" seconds from the time that the user inputs instructions to enter a destination as a POI.

In some embodiments, the estimated time(s) may be based on the type of information. As a non-limiting example, if the user is inputting a POI as a destination, the timeout period may be shorter than a timeout period for inputting a destination as an address.

In some embodiments, the restriction based on timeout periods may be used in conjunction with the operation restriction based on speed. As a non-limiting example, the application 102 may be locked when the first of the speed threshold is exceeded or the timeout period has elapsed. As another example, the application 102 may be unlocked during the unlock timeout period (block 502) unless the speed threshold is exceeded. Of course, other combinations of the timeout restriction and the speed restriction are contemplated.

In some embodiments, the user may override the operation restrictions (e.g., inputting an override command). In some embodiments, the override may occur automatically when more than one passenger is determined to be in the vehicle.

In some embodiments, the user may configure which operation restrictions to use. Further, the user may define the timeout period(s) and/or the speed threshold.

Figure 7:
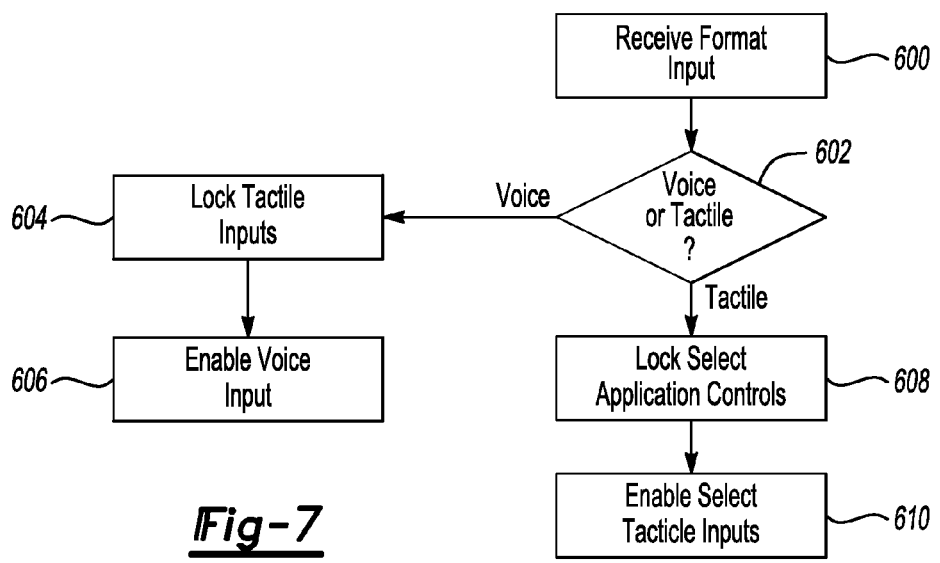
FIG. 7 illustrates a process for determining which features to lock and unlock in the embodiment of FIG. 6.

FIG. 7 illustrates an embodiment of the timeout-based restriction in which select application functions may be restricted. Based on the input received at the ND 53 (block 600), a determination may be made whether the input is tactile or audible (e.g., voice) (block 602). The determination may be made based on a selection from the user (e.g., voice or tactile) or based on a manner in which a command is received.

During an application lockout, the tactile input controls of the application may be locked, but voice inputs may be unrestricted. If audible inputs are received, the tactile inputs may be locked (block 604) and voice inputs received.

Alternatively, if tactile inputs are received, select inputs may be restricted (block 608). Accordingly, when the application is locked, select inputs may still be unrestricted (block 610) so that entire functionality is not lost.

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed:

1. A computer-implemented method comprising:
   monitoring by a nomadic device for a nomadic device travel-speed determining signal;
   if the travel-speed cannot be determined based on the monitoring, determining if an input to a mobile application executing on the nomadic device is restricted or unrestricted;
   if restricted, continuing restriction of the application input until the travel-speed can be determined; and
   if unrestricted, permitting application input until the travel-speed of the nomadic device exceeds a threshold.

2. The computer-implemented method of claim 1 further comprising, if the speed can be determined, determining if the travel-speed exceeds a threshold.

3. The computer-implemented method of claim 2 wherein determining if the one or more inputs are restricted or unrestricted is based on whether the determined speed previously exceeded the threshold.

4. The computer-implemented method of claim 3 wherein the determining is based on a presence of one or more speed restriction flags.

5. The computer-implemented method of claim 1 wherein an input to the mobile application is unrestricted at application start up and, after startup and when the travel-speed can be determined, the method further comprising:
   restricting the input as soon as the travel-speed exceeds the threshold; and
   thereafter restricting the one or more inputs when the travel-speed cannot be determined.

6. The computer-implemented method of claim 1 wherein, if restricted, continuing restriction of application input until travel-speed can be determined, wherein the application input is unrestricted if the travel-speed is less than the threshold.

* * * * *